Figure 1:
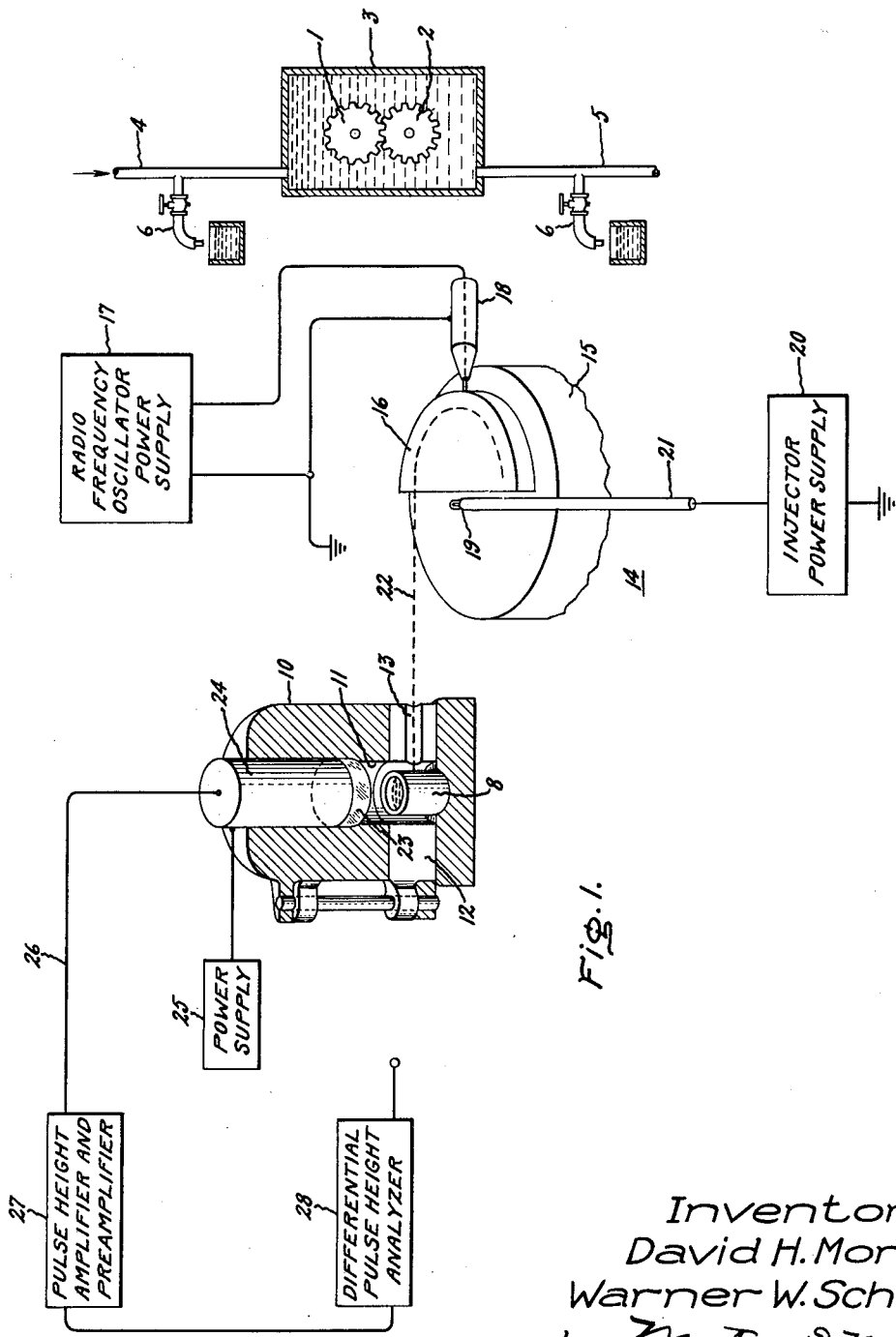

Inventors:
David H. Morley,
Warner W. Schultz,
by [signature]
Their Attorney.

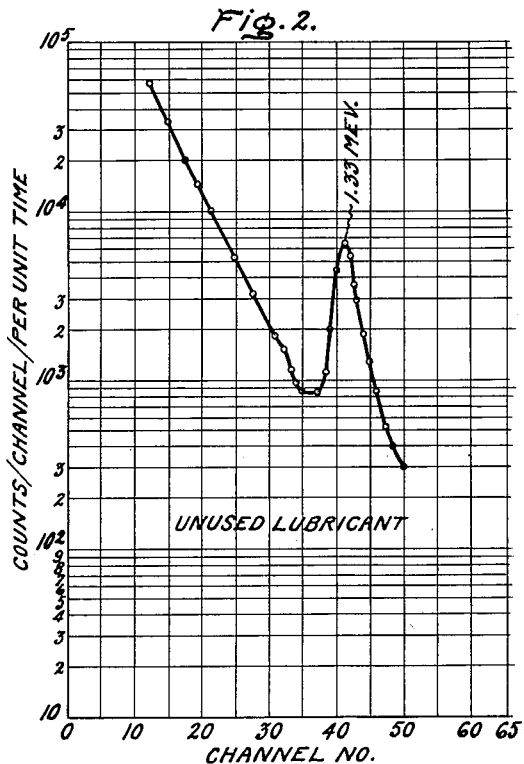
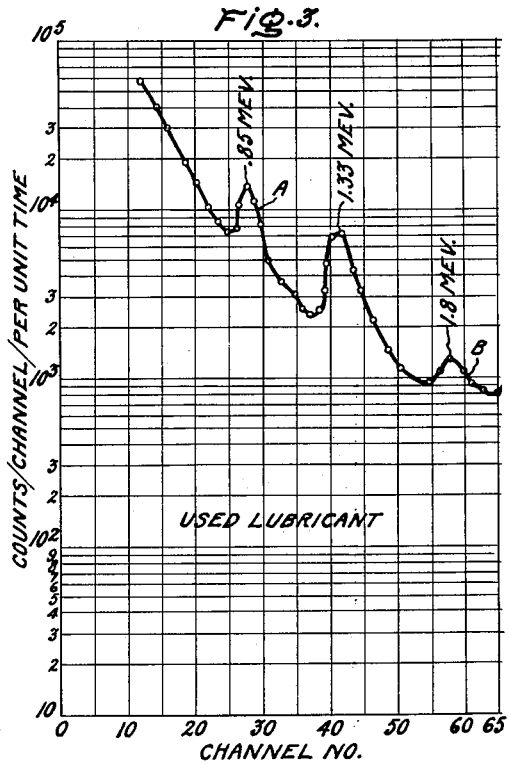
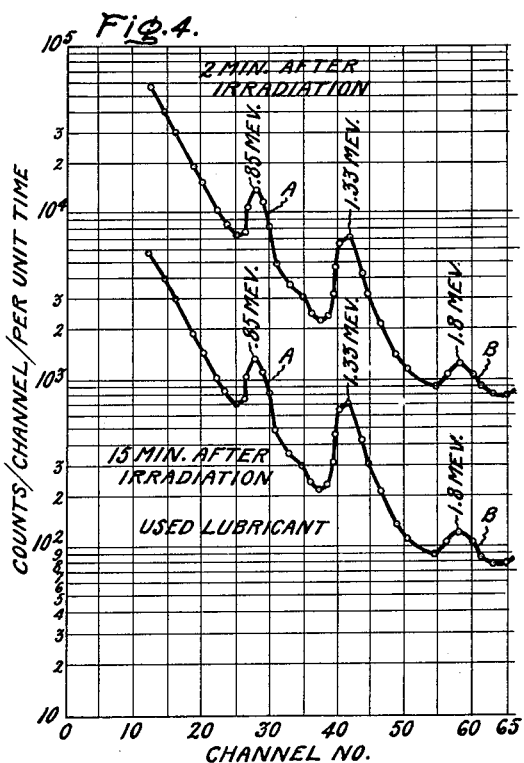
Inventors:
David H. Morley,
Warner W. Schultz,
by *[signature]*
Their Attorney.

United States Patent Office 3,128,381
Patented Apr. 7, 1964

3,128,381
WEAR MEASUREMENT WITHOUT INTRODUCING RADIOACTIVE MATERIAL INTO THE SYSTEM
David H. Morley, Scotia, and Warner W. Schultz, Schenectady, N.Y., assignors to General Electric Company, a corporation of New York
Filed Mar. 31, 1958, Ser. No. 725,223
9 Claims. (Cl. 250—106)

This invention relates to a method for measuring wear and, more particularly, to a radiological method for determining such wear.

It has hitherto been suggested in measuring the wear of gears, bearings, reciprocating parts, etc., to utilize radioactivity as the means for determining wear. In these previous approaches, as typified in U.S. Letters Patent 2,315,845 to S. W. Ferris, the members are made radioactive either by incorporating suitable radioactive matter or by irradiation or bombardment with charged particles such as protons, neutrons, deuterons, etc. The members are then subjected to wear in the presence of a lubricant which removes wear particles produced by attrition and the radioactivity of the lubricant bearing the wear particles is measured to indicate wear.

This prior art approach, although satisfactory for many purposes, does have shortcomings which limit its usefulness and applicability. For example, since it is necessary, in order to carry out the method, to make a portion of the machine radioactive, expensive and elaborate decontamination procedures must be carried out if it is to be utilized again.

Furthermore, the flow of the lubricant carrying the radioactive wear debris from the radioactive parts through the entire machine may contaminate portions other than those which were activated to measure wear, thus necessitating even more complex decontamination procedures especially where a component of a machine of substantial size is involved.

In addition, since radioactivity must be introduced into a factory or test area, it becomes necessary to observe all of the precautions and safeguards required by State and Federal law whenever a radiation source is maintained within a factory or working area.

It is an object of this invention, therefore, to provide a method for measuring the wear between frictionally engaging members which do not require that the members be made radioactive.

Another object of this invention is to provide a method for measuring the wear between frictionally engaging surfaces in a machine element, which eliminates all radiation protection problems with regard to the operator of the mechanism.

A further object of this invention is to provide a wear measuring method wherein only the wear particles from frictionally engaging members are made radioactive.

Other objects and advantages of this invention will become apparent as the description of the invention proceeds.

In carrying out the above objects, frictionally engaging members are subject to wear in the presence of a lubricating fluid which acts as a carrier for the wear particles from the members. A sample of this lubricating fluid, bearing the wear particles, is irradiated in any suitable manner in order to activate the sample and the wear particles. The radioactivity level, and in a preferred embodiment the gamma spectrum, of the activated sample is measured to determine the presence of the wear particles. By comparing the gamma spectrum of a sample of unused oil, and a sample containing a known quantity of the material of which the members are constituted, an accurate, rapid, and efficient analysis of the wear may be achieved.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGURE 1 is an illustration of an embodiment of an apparatus useful in carrying out the method of this invention; and FIGURES 2–4 illustrate graphs useful in describing and understanding the instant invention.

Referring now to FIGURE 1, there is illustrated an apparatus useful in carrying out the method of the instant invention. The two metallic members in frictional engagement are illustrated for the sake of simplicity as two gears 1 and 2, positioned in a housing 3 which has a fluid, such as a lubricant for example, adapted to carry the wear particles from the gears 1 and 2 supplied thereto through an input conduit 4. The lubricant carrying the wear particles is transmitted through an output conduit 5 for disposition, or in some cases, recirculation.

A pair of stopcocks 6, or any other similar device, is positioned in the input and output conduits 4 and 5 to provide a means for removing in suitable containers 8 samples of the unused lubricant in the conduit 4 and the particle bearing used lubricant in the output conduit 5.

For simplicity of explanation, the gears 1 and 2 have been shown within a separate housing, having input and output conduits to facilitate the passage of lubricant to the gears. It is obvious, of course, that in actual operation no such elaborate instrumentality is needed and that the particle bearing lubricant may be removed from the mechanism in any suitable manner prior to the next step of the operation.

The particle bearing lubricant sample in the container 8 is irradiated in order to activate the fluid sample and the wear particles contained therein. To this end, the container 8 is positioned in a housing 10 wherein the sample is irradiated and the level of radioactivity measured. Thus, the housing 10, which may be constructed of any suitable material, such as iron or lead, to provide the requisite shielding has an inner chamber 11 which retains the sample holder 8 and to which access may be had by means of a hinged door 12.

The chamber 11 is so constructed that the sample in the container 8 may be irradiated to activate the sample and the radiation level measured without removing the container. Hence, there is provided a passage 13 extending through the door 12 of the container 10 to permit the passage of a particle beam 22 which activates the sample in container 8. The particle beam which irradiates the sample is provided by a particle accelerator of the cyclotron type. Such a particle accelerator is illustrated at 14 and consists of a magnet structure including a pair of circular pole pieces 15 (only the lower of which is illustrated). Disposed between the pole pieces 15 is a vacuum chamber (also not shown for the sake of simplicity), having a pair of "dee" electrodes 16 (only one of which is shown) positioned to form suitable accelerating gaps for charged particles, which "dee" electrode is excited by a radio frequency oscillator power supply 17 through a suitable cable 18. Centrally disposed relative to the pole pieces 15 is a source of charged particles 19 suitably energized from a conventional injector power supply 20 through a cable 21.

Since the structure and operation of particle accelerating devices of the cyclotron type are well known, a detailed explanation both of the structure and operation will not be necessary and reference is made to the text Introductory Nuclear Physics, Halliday, John Wiley & Sons, Inc., New York, (1950), for a detailed description of the structure of such a cyclotron. Suffice it to say at this point that the operation of the cyclotron 14 is conventional in that charge particles are inserted centrally between the pole pieces 15 in the evacuated tank by the ejector source 19 and accelerated in a spiral path by the combined effects of the magnetic fields between the poles 15 and the potential of the "dee" electrodes 16. Such acceleration continues until the particle attains the desired energy, at which time the particles are removed as the beam 22 from the accelerator by the action of a conventional ejector beam (not shown) and projected through the passageway 13 aligned therewith onto the container 8 and the sample of particle bearing lubricant therein.

Cyclotrons, of the type illustrated in FIGURE 1, are commonly used to accelerate deuterons and hence provide a particle beam made up of deuteron. It is apparent, of course, that accelerator other than cyclotrons may be utilized to provide ionized particles other than deuterons. Thus, for example, protons, alpha-particles, etc., may be used as the activating particle beams by utilizing linear accelerators, betatrons, bevatrons, etc., or, in fact, any other accelerating device which produces a beam of charged particles effective to activate the sample. In addition, it is also obvious that neutrons, either fast or thermal, may also be utilized to activate the sample by positioning it in the neutron flux of a reactor. Thus, the cyclotron illustrated in FIGURE 1 is, by way of example only, one of many diverse instrumentalities which may be utilized to activate the particle bearing lubricant.

The now activated sample carrying the wear particles from the gears is analyzed to determine its radioactivity level, and preferably by measuring the gamma energy spectrum of the sample, in order to determine the presence of the wear particles by their radiation energy levels, intensity, half-lives, etc., to ascertain the magnitude of the wear. A scintillation spectrometer of well known construction is utilized for analyzing the gamma ray spectrum of the activated sample and a gamma ray scintillation detector, such as a thallium activated sodium iodide crystal 23 and a photomultiplier 24, are mounted in the internal chamber 11 to transform the gamma radiations into flashes of light which rae detected by the photomultiplier tube 24 which is energized from a precisely regulated high voltage supply 25, to produce an output voltage proportional to the energy of the gamma radiation.

The output of the scintillation detector constituted of the crystal 23 and the photomultiplier 24 is applied by means of a suitable lead 26 to a preamplifier and amplifier assembly 27 to produce signals of a magnitude suitable for analyzing since the output of the scintillation detector is of an extremely low amplitude. The amplified signals are fed from the amplifier assembly 27 to a differential pulse height analyzer 28, indicated in block diagram form, which determines the number of pulses of differing amplitudes occurring per unit time. That is, the pulses are segregated according to their amplitude and are counted according to the frequency of their occurrence. In order to provide a highly accurate measure of the energy level it is desired, in the preferred embodiment, to use a multichannel pulse height analyzer which segregates the pulses into discrete amplitude and, hence, energy ranges. The output pulses in the analyzer is scaled and stored in appropriate devices to retain the number of pulses in each one of the channels. This information may then be read out by (1) oscilloscope, (2) strip chart recorder, or (3) tape. Preferably, however, plotting the information from the pulse height analyzer on four cycle semi-log paper is most useful in determining all of the desired information.

In operation the method of the instant invention may be carried out in the following manner. The metallic surfaces are subjected to wear in the presence of a fluid, such as a lubricant, which lubricant acts as a carrier for any wear particles or debris produced from the metallic surfaces. A sample of the lubricant carrying the wear particles is removed from the system in any suitable manner into a container, as is a sample of the unused lubricant used in the system.

Lubricant samples to be analyzed are then irradiated in order to activate them by placing them in the path of a charged particle beam, such as that produced by a cyclotron, betatron, bevatron, etc., or by placing the samples in the neutron flux of an atomic pile. The now activated sample is placed, if it is not already there, in a shielded container in order to determine the radioactivity level of the sample by means of the gamma spectrum analysis. In some circumstances when it is found that the irradiation activates the container it may be desirable to transfer the activated sample to a fresh container before analysis of the gamma spectrum in order to eliminate background radiation or radiation due to activation of the container.

The gamma radiation spectrum of both the particle bearing lubricant sample and the activated unused lubricant sample is then taken and plotted on graph paper in order to identify, by means of their energy levels, the elements constituting the wear particles. It is immediately apparent that the gamma analysis of the used sample produces gamma energy peaks for the wear particles which will not appear when the gamma ray spectrum of the unused lubricant sample is determined.

Referring now to FIGURE 2, a graph of the gamma spectrum for the unused lubricant is illustrated and plotted to show the relationship between the counts per channel per unit time along the ordinate and the channel numbers along the abscissa, with the latter being the equivalent to energy levels in million electron volts (m.e.v.). Thus, there is shown a curve bearing the legend "Unused Lubricant" which shows a number of gamma ray energy peaks labeled in m.e.v. which represents activated elements in the unused oil sample. Thus, for example, a gamma energy peak at 1.33 m.e.v. represents a radioactive isotope of sodium formed $Al^{27}$ aluminum which is representative of an additive in the oil or an impurity picked up from the system.

FIGURE 3 shows a similar graph of the used sample which may contain the wear particles which it is desired to detect. This graph is similarly plotted in counts per channel per unit time along the ordinate and channel number, representing energy levels in m.e.v. along the abscissa. The curve is labeled, in a manner similar to that of FIGURE 2, as "Used Lubricant." It will be noted that the same gamma energy peak representing sodium 24 (i.e., 1.33 m.e.v.) appears, again representing either an additive or an impurity. However, at points labeled A and B, a pair of gamma energy peaks may be noted at .85 m.e.v. and at 1.8 m.e.v., which energy peaks are determined to be those of manganese 56, and hence represent wear particles from the surface of the frictionally meshing metallic surfaces. The manganese 56 isotope was produced by the bombardment of an iron alloy containing manganese, in this case by thermal neutrons to produce this particular istotope. The various associated nuclear reactions which produce the various isotopes illustrated by the gamma peaks in FIGURES 2 and 3 are listed, by way of example, in the table below.

| Gamma Energy E (m.e.v.) | Half-life T ½ (min.) | Reaction |
| --- | --- | --- |
| 1.33 | 922.4 | $Al^{27}$ (n, α) $Na^{24}$ |
| .85 | 154.6 | $Mn^{55}$ (n, γ) $Mn^{56}$ |
| 1.81 | 155.4 | $Mn^{55}$ (n, γ) $Mn^{56}$ |

Thus, it can be seen from FIGURES 2 and 3 and the above table that the presence of wear particles within the used oil produces individual gamma peaks which may be identified by their energy levels with the aid of compiled nuclear data such as may be found in the publication Nuclear Data, Circular of the National Bureau of Standards, 499, Department of Commerce, published September 1, 1950, which is a collection of experimental values of half-lives, radiation energies, relative isotopic abundances, nuclear moments, and cross sections.

To aid in the identification of the various isotopes produced in the irradiated sample, and in particular that due to the wear particles found therein, it is desirable to take the gamma energy spectrum of the activated sample at different times in order to determine the decay of the radioactivity of the sample and hence the half-life characteristics of the isotopes contained therein. FIGURE 4 illustrates graphically the curves for an irradiated sample with the gamma spectra taken at two different times. The first curve is labeled "2 minutes after irradiation," whereas the lower one is labeled "15 minutes after irradiation."

As can be easily observed from these curves which once again plot counts per channel as against channel numbers, that the same gamma peaks representative of particular isotopes, are again present but at reduced amplitudes, which represent the decay of the radioactivity of the isotopes with time. Knowing the time between readings of the samples, it is now possible to determine the half-life of the isotopes, which value is a constant characteristic of the isotope. The half-life of an isotope, as is well known to those skilled in the art, is the time required for the disintegration rate of a radioactive isotope to decrease to one-half of its intial rate.

In order to determine the amount of wear which has taken place, and hence the weight of wear particles contained in individual activated samples, it is necessary that a reference radiation level for the individual materials of which the frictionally engaging surfaces are constituted be established. A sample containing a known weight, in milligrams or even micrograms for example, of the constituent gear materials is irradiated and utilized as a reference sample. The gamma spectrum of this reference sample and the magnitude of the gamma peaks are utilized in conjunction with the gamma spectrum from the unknown sample to determine the weight of particle material in the unknown sample. Hence, a simple, accurate, and rapid method for determining the amount of wear taking place between the frictionally engaging surface is available.

Similarly, the gamma spectrometer in FIGURE 1 may be calibrated by means of cobalt 60 and cesium 137 standards before each analysis. In this manner, the gamma energy reading produced by the spectrometer will be maintained accurate by means of these known standards. As an alternative procedure, rather than activating the entire sample, the wear particles may be separated from the carrier lubricant by filtering with a Milipore filter and only the particles activated.

Hitherto, in describing the method embodying applicants' invention the fluid which is adapted to carry the wear particles has been described as a liquid and preferably a lubricating liquid. However, the fluid may equally well be a gaseous fluid such as may be found, for example, in an air bearing. In such a circumstance the method described previously may be carried out substantially in the same form to produce an indication of the wear of the bearing. Thus, air samples are extracted in the vicinity of the bearing surface, and are filtered to remove the entrained particles which represent wear debris from the bearing. The particles may then be removed from the filter and irradiated directly to activate them, or the particles may then be suspended in a carrier medium of some sort and irradiated or, alternatively, the entire filter including the particles may be activated. The irradiated particles are then, as described above, subjected to analysis to determine the gamma ray spectrum of the activated particles to determine both the presence of the wear particles and the magnitude thereof.

It is apparent from the preceding description that applicants have provided a unique method for determining the wear of frictionally engaging metallic surfaces, which does not necessitate making these surfaces radioactive or making the lubricant radioactive while it is in the machine. Hence, problems of decontamination are avoided, there is no necessity for elaborate safety precautions due to the presence of radioactive material in the vicinity of the machine, or in fact in the plant itself, since the samples to be analyzed may be removed and shipped outside of the plant to a special laboratory or area where the analysis takes place. Thus, many of the difficulties and inconveniences of the prior art approaches have been solved in a simple and efficient and effective manner.

While a particular embodiment of this invention has been shown it will, of course, be understood that it is not limited thereto since many modifications may be made. It is contemplated by the appended claims to cover any such modifications as fall within the true spirit and scope of this invention.

What we claim as new and desire to secure by Letters Patent of the United States is:

1. In a method for determining the wear of a member without introducing radioactive material into the system including, the steps comprising subjecting a non-radioactive member to wear in the presence of a fluid capable of carrying the wear particles from said member, irradiating only said wear particles to make said wear particles radioactive, and determining the amount of wear from the radioactivity of said wear particles.

2. In a method for determining surface wear without introducing radioactive material into the system including, the steps of subjecting a non-radioactive member to wear in the presence of a fluid capable of carrying the wear particles from said member, irradiating only a sample of said fluid and said particles to induce radioactivity and determining the amount of wear of said member from the radioactivity of said wear particles in said sample.

3. In a method for determining the wear of a frictionally engaging member without introducing radioactive material into the system, the steps comprising subjecting a non-radioactive member to wear in the presence of a fluid capable of carrying wear particles from said member, removing a sample from the system irradiating said sample to make said particles radioactive, and determining the amount of wear from the radioactivity of said wear particles.

4. In a method for determining surface wear of an element of a system without introducing radioactive material into the system, the steps of subjecting a non-radioactive surface to wear in the presence of a fluid capable of carrying the wear particles from said surface, irradiating only samples of fluid carrying respectively wear particles from said surface and a known amount of material of the same composition as said surface, and determining the amount of wear from the relative radioactivity of said samples.

5. The method for determining the wear of metallic surface without introducing radioactive material into the system, comprising the steps of subjecting a non-radioactive surface to wear in the presence of a lubricant adapted to carry wear particles from said surfaces, irradiating only a sample of said particle bearing lubricant to activate said wear particles, and measuring the gamma energy spectrum of said sample to determine the activity level of said wear particles.

6. In a method for determining the wear of metallic surfaces without introducing radioactive material into the system, comprising the steps of subjecting a non-radioactive surface to wear in the presence of a fluid adapted to carry the wear particles from said surface removing a sample from the system, irradiating only a sample of said fluid to activate wear particles, measuring the gamma energy spectrum of said sample at a first time to determine the radioactivity of said wear particles, and measuring the gamma energy spectrum of said sample at least at one further time to determine the decay characteristic of the wear particle radioactivity.

7. In a method for determining wear without introducing radioactive material into the system, the steps comprising subjecting a non-radioactive member to wear in the presence of a gaseous fluid capable of carrying the wear particles from said member, filtering said gaseous fluid to remove wear particles entrained in said fluid, irradiating only said particles to make them radioactive, and determining the amount of wear from the radioactivation of said wear particles.

8. In a method for determining the wear of a member without introducing radioactive material into the system, the steps comprising collecting particles worn from a non-radioactive member by friction, radiologically measuring the amount of wear particles thus collected, said last named step including the further step of irradiating only said collected wear particles to cause them to become radioactive and measuring the radiations emitted from said activated particles.

9. The method of determining the wear of a member without introducing radioactive material into the system including the steps comprising subjecting a non-radioactive member to wear, collecting a sample containing wear particles, irradiating the sample to induce radioactivity therein, and determining the amount of wear from the radioactivity of said wear particles.

References Cited in the file of this patent

UNITED STATES PATENTS

| | | |
|---|---|---|
| 2,744,199 | Juterbock et al. | May 1, 1956 |
| 2,751,506 | Black et al. | June 19, 1956 |
| 2,811,650 | Wagner | Oct. 29, 1957 |